United States Patent
Eberlein et al.

(10) Patent No.: US 12,445,068 B2
(45) Date of Patent: Oct. 14, 2025

(54) CONTROL DEVICE FOR AN INVERTER, ELECTRIC DRIVE SYSTEM AND METHOD FOR ESTABLISHING A SAFE OPERATING MODE

(71) Applicant: Robert Bosch GmbH, Stuttgart (DE)

(72) Inventors: Edwin Eberlein, Stuttgart (DE); Daniel Raichle, Vaihingen (DE); Manfred Kirschner, Stuttgart (DE); Thomas Merkel, Sachsenheim-Hohenhaslach (DE); Thomas Knorpp, Murr (DE); Volker Gilgenbach, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 17/927,396

(22) PCT Filed: Apr. 30, 2021

(86) PCT No.: PCT/EP2021/061410
§ 371 (c)(1),
(2) Date: Nov. 23, 2022

(87) PCT Pub. No.: WO2021/239386
PCT Pub. Date: Dec. 2, 2021

(65) Prior Publication Data
US 2023/0246570 A1  Aug. 3, 2023

(30) Foreign Application Priority Data
May 25, 2020 (DE) .................. 10 2020 206 478.4

(51) Int. Cl.
*H02P 6/16* (2016.01)
*H02H 7/08* (2006.01)
*H02P 3/22* (2006.01)

(52) U.S. Cl.
CPC ................ *H02P 3/22* (2013.01); *H02H 7/08* (2013.01); *H02P 6/16* (2013.01)

(58) Field of Classification Search
CPC ................ H02P 3/22; H02P 6/16; H02H 7/08
See application file for complete search history.

(56) References Cited

U.S. PATENT DOCUMENTS 6,965,206 B2 * 11/2005 Kamen .................. B62D 57/00
388/903
8,575,885 B2 * 11/2013 Okumatsu ........... H02P 29/0243
318/400.29

(Continued)

FOREIGN PATENT DOCUMENTS

DE           29813080 U1     10/1998
DE       102011081173 A1      2/2013

(Continued)

OTHER PUBLICATIONS

Translation of International Search Report for Application No. PCT/EP2021/061410 dated Jul. 15, 2021 (2 pages).

*Primary Examiner* — Rina I Duda
(74) *Attorney, Agent, or Firm* — Michael Best & Friedrich LLP

(57) ABSTRACT

The present invention relates to establishing a rotational speed-dependent safe operating mode. For this purpose, two redundant control paths are provided and are each designed to establish either an active short-circuit or a freewheeling mode as the safe operating mode. In this way, even if one control path fails, a rotational speed-dependent safe operating mode can still be fully established.

13 Claims, 3 Drawing Sheets

(56) References Cited

U.S. PATENT DOCUMENTS

| | | | | |
|---|---|---|---|---|
| 8,602,172 B2* | 12/2013 | Suzuki | ............... | B66B 1/2458 |
| | | | | 187/382 |
| 8,800,722 B2* | 8/2014 | Kodera | ............... | B66B 5/021 |
| | | | | 187/388 |
| 9,154,051 B2* | 10/2015 | Raichle | ............... | H02M 1/38 |
| 2011/0156627 A1* | 6/2011 | Nakamura | ............ | B62D 5/0487 |
| | | | | 318/400.22 |
| 2011/0309777 A1* | 12/2011 | Welchko | ............ | B60L 7/08 |
| | | | | 318/376 |
| 2014/0015463 A1* | 1/2014 | Merkel | ............ | B60L 3/0061 |
| | | | | 318/490 |
| 2014/0055077 A1* | 2/2014 | Barrass | ............ | G05B 9/02 |
| | | | | 318/700 |
| 2014/0361719 A1* | 12/2014 | Raichle | ............... | H02P 27/06 |
| | | | | 318/400.34 |
| 2015/0048767 A1* | 2/2015 | Takezawa | ............ | H02P 6/14 |
| | | | | 327/109 |
| 2017/0237377 A1* | 8/2017 | Furukawa | ............ | H02P 29/028 |
| | | | | 318/564 |
| 2017/0305274 A1* | 10/2017 | Saha | ............ | B60L 3/003 |
| 2020/0021233 A1* | 1/2020 | Kimura | ............ | B62D 5/0484 |

FOREIGN PATENT DOCUMENTS

| | | |
|---|---|---|
| EP | 0999631 A1 | 5/2000 |
| EP | 2600492 A1 | 6/2013 |
| EP | 3151413 A1 | 4/2017 |
| JP | H05336785 A | 12/1993 |
| WO | 2017211487 A1 | 12/2017 |

* cited by examiner

CONTROL DEVICE FOR AN INVERTER, ELECTRIC DRIVE SYSTEM AND METHOD FOR ESTABLISHING A SAFE OPERATING MODE

BACKGROUND OF THE INVENTION

The present invention relates to a control device for an inverter, an electric drive system, and a method for establishing a safe operating mode in an electric drive system.

Electric drive systems are becoming increasingly important. In particular, electric drive systems are found in wholly or at least partially electrically driven vehicles. For safety reasons, in this case it is necessary to establish a safe operating mode in the event of a fault, in particular in the case of a fault in the control of the inverter in such a drive system. For example, an active short-circuit or what is known as a freewheeling mode are known as such safe operating modes.

In the case of an active short-circuit, the phase connections of the electric machine are electrically short-circuited by means of the switching elements in the inverter. By contrast, in the case of a freewheeling mode, all switching elements of the inverter may be opened so that the phase connections of the electric machine are not electrically connected to one another.

The publication DE 10 2011 081 173 A1 describes an operating mode circuit for inverters and a method for establishing operating modes in an inverter. In this case, it is in particular proposed to switch to a freewheeling mode as a safe operating mode in the inverter if a rotational speed of the electric machine is less than a predetermined rotational speed threshold value, and to switch the inverter into an active short-circuit if the determined rotational speed of the electric machine is greater than or equal to a predetermined threshold rotational speed.

SUMMARY OF THE INVENTION

The present invention discloses a control device for an inverter in an electric drive system, an electric drive system, and a method for establishing a safe operating mode in an electric drive system, with the features of the independent claims. Further advantageous embodiments are the subject matter of the dependent claims.

Accordingly, the following is provided:

a control device for an inverter in an electric drive system having a first control path and a second control path. The first control path and the second control path are each designed to establish a safe operating mode in the inverter of the electric drive system. The first control path comprises a first safety device. The first safety device is designed to determine a rotational speed of the electric machine of the electric drive system. Furthermore, the first safety device is designed to establish either an active short-circuit or a freewheeling mode in the inverter using the determined rotational speed of the electric machine. The second control path comprises a second safety device. The second safety device is designed to determine the rotational speed of the electric machine in the electric drive system. Furthermore, the second safety device is designed to establish either an active short-circuit or a freewheeling mode in the inverter using the rotational speed of the electric machine determined by the second safety device.

Furthermore, the following is provided:

an electric drive system having an electric machine, an inverter which is designed to control the electric machine, and a control device according to the invention for the inverter.

Finally, the following is provided:

a method for establishing a safe operating mode in an electric drive system. The method comprises a first determination of a rotational speed of an electric machine of the electric drive system, and a first establishment of a safe operating mode in the electric machine by means of a first control path. The establishment of the safe operating mode in this case takes place using the determined rotational speed. Depending on the determined rotational speed, either an active short-circuit or a freewheeling mode is established in the inverter of the electric drive system. Furthermore, the method comprises a second determination of a rotational speed of the electric machine of the electric drive system, and a second establishment of a safe operating mode in the electric machine. The second determination of the rotational speed and the second establishment of the safe operating mode in this case take place by means of a second control path. Analogous to the first establishment of the safe operating mode, the second establishment of the safe operating mode also takes place using the determined rotational speed, wherein either an active short-circuit or a freewheeling mode is established in the inverter of the electric drive system.

The present invention is based on the finding that different safe operating modes are advantageous depending on a rotational speed of the electric machine in an electric drive system. Therefore, a rotational speed-dependent selection of the relevant suitable safe operating mode may be advantageous. It is a further finding of the present invention that, in the event of a fault of a conventional system, it may be possible that sufficient information about the rotational speed of the electric machine is not present, or the evaluation of the rotational speed information cannot take place in a suitable manner.

It is therefore an idea of the present invention to take this finding into account and to further improve the safety and reliability of an electric drive system, in particular for the establishment of rotational speed-dependent safe operating modes. For this purpose, it is provided to implement a rotational speed-dependent establishment of safe operating modes by means of two separate control paths. The two control paths in this case form two redundant control paths for a rotational speed-dependent establishment of safe operating modes. In this way, the relevant suitable safe operating mode can also be reliably established in the event that a fault occurs in one of the two control paths.

As a result of the redundant realization of rotational speed-dependent safe operating modes, a relevant suitable safe operating mode may be established even if a fault occurs in one of the two control paths. In this way, for example, it may be ensured that potentially dangerous voltage peaks in the electric drive system are avoided. The occurrence of unwanted high electric currents may also be avoided by a suitable selection of the relevant safe operating mode. Moreover, by means of a redundant implementation of rotational speed-dependent operating modes, it is also possible to prevent the establishment of an operating mode which would possibly result in an undesirably high decelerating torque.

The redundant rotational speed-dependent selection and establishment of safe operating modes thus leads to increased safety. Moreover, dangerous voltage or current peaks, which would lead to destruction or at least premature aging of the affected components, may be avoided.

According to one embodiment, the first safety device and/or the second safety device are designed to establish an active short-circuit in the inverter in the event that the determined rotational speed of the electric machine exceeds a first threshold value. Additionally or alternatively, the respective safety devices can establish a freewheeling mode in the event that the determined rotational speed of the electric machine falls below a second threshold value.

In particular, the second threshold value may be greater than the first threshold value. In this way, a hysteresis may be realized between the change of the freewheeling mode and of the active short-circuit. An active short-circuit may lead to an active braking torque of the electric machine. Such a braking torque may lead to a strong deceleration, in particular at low rotational speeds, which may lead, for example in the case of electric vehicles, to losses of traction and thus dangerous driving situations. On the other hand, at higher rotational speeds, undesirably high voltage peaks may occur in the freewheeling mode, which may lead to dangerous states within the drive system, in particular within the voltage converter.

According to one embodiment, the control device is designed to control an inverter having a plurality of half-bridges. Normally, a half-bridge having an upper switching element and a lower switching element is provided in the inverter for each phase of an electric machine. In this case, the first safety device and the second safety device may be designed to control the switching elements in the individual half-bridges, using phase currents in the corresponding phases, for the establishment of a freewheeling mode. This way, it may be ensured that, in the transition into the freewheeling mode, a brief overvoltage in the intermediate circuit capacitor of the inverter does not occur even in the absence of a connection to an electrical energy source such as, for example, the traction battery in an electric vehicle. For example, the phase currents in the individual phases may be detected and monitored. The individual switching elements may thus be controlled at a zero crossing, or close to the zero crossing, of the corresponding phase current, wherein the control to establish a freewheeling mode comprises in particular the opening of the switching elements in the corresponding half-bridge.

According to one embodiment, the first safety device and/or the second safety device are designed to control the switching elements in the individual half-bridges, using phase voltages in the corresponding phases, for the establishment of an active short-circuit. For example, the corresponding switching elements may be activated to form a phase angle in which the current would be assumed by the corresponding switching element even in a stationary operation. An excessive increase of the phase current, with a correspondingly high loading of the relevant switch, may be avoided in this case. In particular, a detected voltage-time surface of the relevant phase may be taken into account for the determination of a suitable point in time for controlling the respective switching elements. For example, the switching elements in a half-bridge may thus be switched if the voltage-time surface of the corresponding phase reaches half of its maximum value. If applicable, switching may also take place earlier, since this has no influence due to the negative current direction.

According to one embodiment, the first safety device is designed to verify the determined rotational speed of the electric machine using the rotational speed determined by the second safety device. The redundant detection of the rotational speed of the electric machine by means of the first safety device and the second safety device thus enables functional testing of the individual components during operation. In particular, a malfunction of the rotational speed determination may be perceived by comparing the rotational speeds determined in the safety devices. Of course, the second safety device may also verify the determined rotational speed using the rotational speed determined by the first safety device.

According to one embodiment, the first control path is designed to be fed from a low-voltage side of the electric drive system. The second control path may be designed to be fed from a high-voltage side of the electric drive system. In this way, a high independence of the two control paths may be realized. For example, even in the event of a failure of the supply voltage on the low-voltage side, and thus a complete failure of the first control path, a safe operating mode, in particular a rotational speed-dependent safe operating mode, can be established by means of the second control path.

According to one embodiment, the second safety device is designed to establish the freewheeling mode as a safe operating mode in the event that an intermediate circuit voltage of the inverter falls below a predetermined first threshold voltage. In particular, the freewheeling mode may be selected as a safe operating mode even if an active short-circuit should be selected due to the determined rotational speed. In this way, the intermediate circuit voltage may be increased by briefly establishing the freewheeling mode, and thus an energy supply to the second control path may be ensured.

According to one embodiment, the second safety device is designed to establish the active short-circuit as a safe operating mode in the event that the intermediate circuit voltage of the inverter exceeds a predetermined second threshold voltage and the determined rotational speed is greater than the first threshold value. Dangerous voltage excesses at the intermediate circuit capacitor may be avoided as a result. In particular, the second threshold voltage may be set such that the intermediate circuit voltage is always less than an electrical voltage of an energy source which may be connected to the intermediate circuit capacitor, for example the traction battery of an electric vehicle.

According to one embodiment, the second safety device is designed to determine the rotational speed of the electric machine during the active short-circuit using forward voltages through the switching elements in the inverter. In particular, the forward voltage of switching elements which establish the active short-circuit, that is to say which are closed during the active short-circuit, may be used in this case. The rotational speed of the electric machine may therefore be determined on the high-voltage side without additional components.

According to one embodiment, the second safety device is designed to determine the rotational speed of the electric machine during the freewheeling mode using at least two phase voltages of the electric machine. In particular, at least two phase voltages may be evaluated with respect to a predetermined reference potential. The rotational speed of the electric machine may thus also be determined on the high-voltage side without additional components during the freewheeling mode.

The above embodiments and developments can be arbitrarily combined with one another insofar as is reasonable. Further embodiments, developments, and implementations of the invention also include combinations, even those not explicitly mentioned, of features of the invention described above or in the following with regard to the exemplary embodiments. The person skilled in the art will in particular also add individual aspects as improvements or additions to the relevant basic form of the invention.

BRIEF DESCRIPTION OF THE DRAWINGS

Further features and advantages of the invention will be explained in the following with reference to the drawings, in which.

DETAILED DESCRIPTION

Figure 1:
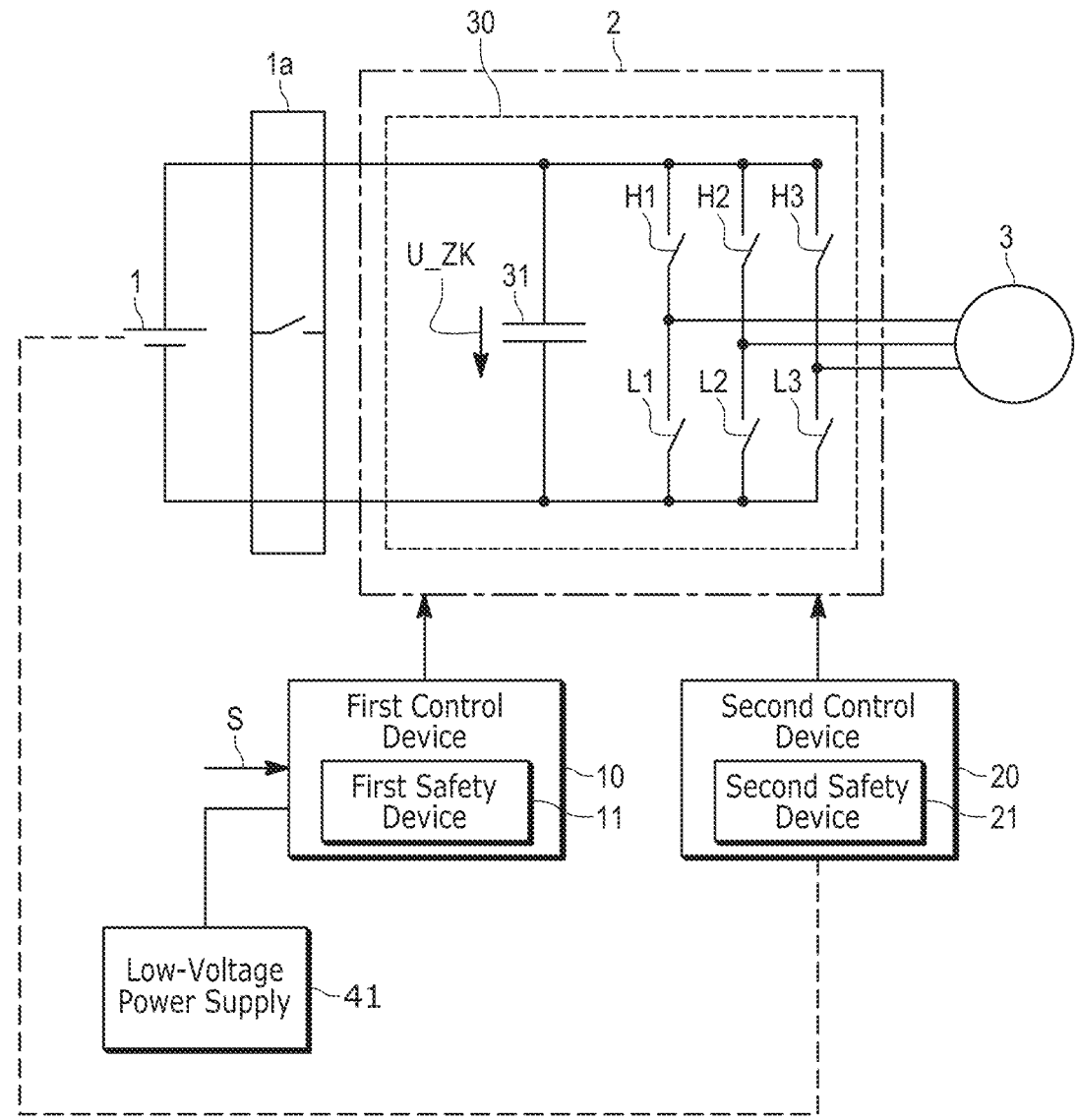
FIG. 1: is a schematic view of a block diagram of an electric drive system according to an embodiment.

FIG. 1 is a schematic view of a block diagram of an electric drive system according to an embodiment. The electric drive system may be, for example, the electric drive system of a wholly or at least partially electrically driven vehicle. The electric drive system may be fed by an electrical energy store 1, for example a traction battery of an electric vehicle. The energy provided by the electrical energy store 1 may be provided at the input terminal of an inverter arrangement 2, optionally via a battery isolation switch 1a. The inverter arrangement 2 may comprise, for example, an inverter 30 having a plurality of switching elements. For example, an intermediate circuit capacitor 31 may be provided at the input terminal of the inverter 30. An output terminal of the inverter arrangement 2, in particular at the output terminal of the inverter 30, may be connected to an electric machine 3. The arrangement depicted here having a three-phase electric machine 3 serves only as an example for better comprehension. Of course, electric machines 3 having any other number of electrical phases are also possible.

The inverter 30 can comprise, for example, for each phase of the electric machine 3, a half-bridge having an upper switching element H1, H2, H3 and a lower switching element L1, L2, L3. During normal functional operation of the electric drive system, the inverter 30, in particular the switching elements in the inverter 30, may be controlled by means of control signals from a control device in a first control path 10. For this purpose, setpoint value specifications and possibly also sensor signals of operating variables of the drive system may be received in the control device, for example. Based on these setpoint values S and sensor values, the control device may generate suitable control signals for controlling the upper switching elements H1, H2, H3 and the lower switching elements L1, L2, L3.

The control device in the first control path 10 may, for example, be a main computer which, during operation of the electric drive system, transmits the required operating parameters and generates the suitable control signals for controlling the inverter 30. Under certain circumstances, for example if a fault is detected in the electric drive system, it may be necessary to establish what is known as a safe operating mode in the electric drive system, in particular in the inverter 30. This safe operating mode may be, for example, what is known as a freewheeling mode, in which all switching elements H1, H2, H3 and L1, L2, L3 of the inverter 30 are open. Alternatively, what is known as an active short-circuit may be established as a safe operating mode, in which the phase connections of the electric machine 3 are electrically connected to one another by means of the upper switching elements H1, H2, H3 or the lower switching elements L1, L2, L3.

As will be explained in more detail in the following, the selection as to whether the freewheeling mode or the active short-circuit is established as a safe operating mode may be determined depending on the current rotational speed of the electric machine 3. For this purpose, a first safety device 11 which determines the rotational speed of the electric machine 3 may be provided in the first control path 10. This determined rotational speed may be used for the decision as to whether the active short-circuit or the freewheeling mode is to be established as a safe operating mode. For example, a threshold value for the rotational speed may be established and, in the event that the rotational speed exceeds this threshold value, the active short-circuit is established as a safe operating mode. Below this threshold value, the freewheeling mode may be established as a safe operating mode. If the rotational speed of the electric machine 3 varies while a safe operating mode is to be established, a hysteresis may be provided for the change between the active short-circuit and the freewheeling mode. In this event, a first threshold value n1 may be provided which, if exceeded, induces a change from freewheeling mode into the active short-circuit. A second threshold value n2 may also be provided which, if fallen below, induces a change from the active short-circuit into the freewheeling mode. In this case, the rotational speed for the first threshold value n1 may be smaller than the rotational speed for the second threshold value n2.

Figure 2:
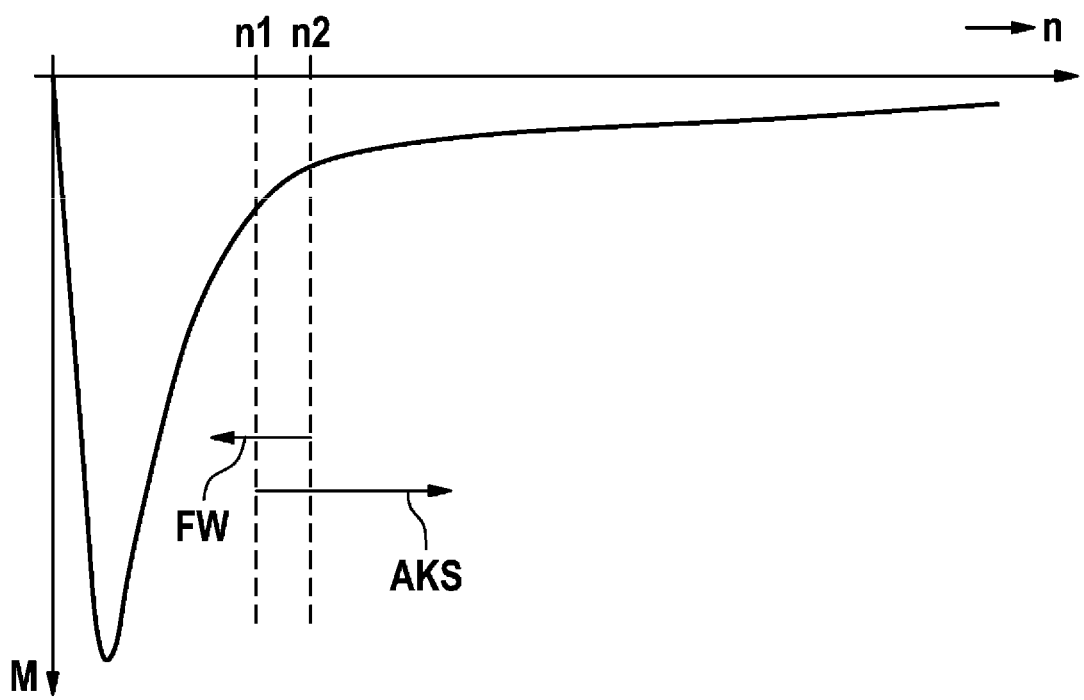
FIG. 2: is a schematic view of the profile of a braking torque over the rotational speed during an active short-circuit.

FIG. 2 is a schematic diagram for the profile of a braking torque M of the electric machine 3 as a function of the rotational speed n during an active short-circuit. As is apparent here, the active short-circuit may cause a strong braking torque, in particular at low rotational speeds. Such a strong braking torque may, for example, lead to the loss of traction between the wheels and the roadway in electric vehicles. In order to avoid such dangerous driving situations, the active short-circuit is only established at higher rotational speeds, whereas at lower rotational speeds the freewheeling mode is established as the safe operating mode. As is further shown in FIG. 2, a hysteresis described above may be provided between the rotational speed for the first threshold value n1 and the rotational speed for the second threshold value n2. Upon establishing the safe operating mode for the first time, either the first threshold value n1 or the second threshold value n2 may be used for the decision as to whether the active short-circuit or the freewheeling mode is to be established. Moreover, any other approaches, for example with a rotational speed in the range between n1 and n2, are also possible in principle.

In particular the electrical voltages and currents in the inverter 30, in particular at the switching elements H1, H2, H3, L1, L2, L3, may be taken into account for the first establishment of a safe operating mode in the freewheeling mode or active short-circuit, and also for the change between the active short-circuit and the freewheeling mode. In particular, a point in time which suitably avoids an excessive increase of electrical voltages and/or currents may be provided in this case for the opening or closing of the individual switching elements. For example, it may be advantageous to open a switching element at a zero crossing of the electric current or at least close to the zero crossing, in order to avoid voltage spikes.

If only a first control path 10 is provided for the control of the inverter 30, the establishment of the safe operating mode, and in particular the rotational speed-dependent change between the active short-circuit and the freewheeling mode, may also be realized only via the first safety device 11. Moreover, an additional component may optionally be provided which, in the case of a complete failure of the first control path 10, establishes a fixedly predetermined safe operating mode, for example an active short-circuit. In this instance, however, no rotational speed-dependent establishment of the safe operating mode would be possible in the case of a failure of the first control path 10.

Therefore, a second control path 20 having a second safety device 21 is provided in the electric drive system according to FIG. 1. This second safety device 21 can also determine the rotational speed of the electric machine 3 and, as necessary, in particular in the event of a fault, can establish a rotational speed-dependent safe operating mode in the inverter arrangement 2, in particular in the inverter 30. The concept of the rotational speed-dependent establishment of a safe operating mode corresponds to the greatest possible extent to the previously described approach for establishing the freewheeling mode or the active short-circuit depending on the current rotational speed of the electric machine 3.

The first control path 10 may be fed by a low-voltage network, for example. Such a low-voltage network is, for example, a power supply 41 which is separate or independent from the energy source 1. In particular, the voltage level of the low-voltage network may be lower than the voltage level of a high-voltage network with the energy source 1 which feeds the electric drive system.

The second control path 20 may, for example, be fed from the high-voltage side of the electric drive system. In this way, a safe operating mode can continue to be established by means of the second safety device 21 in the second control path 20, even in the case of failure or a malfunction on the low-voltage side of the electric drive system.

Figure 3:
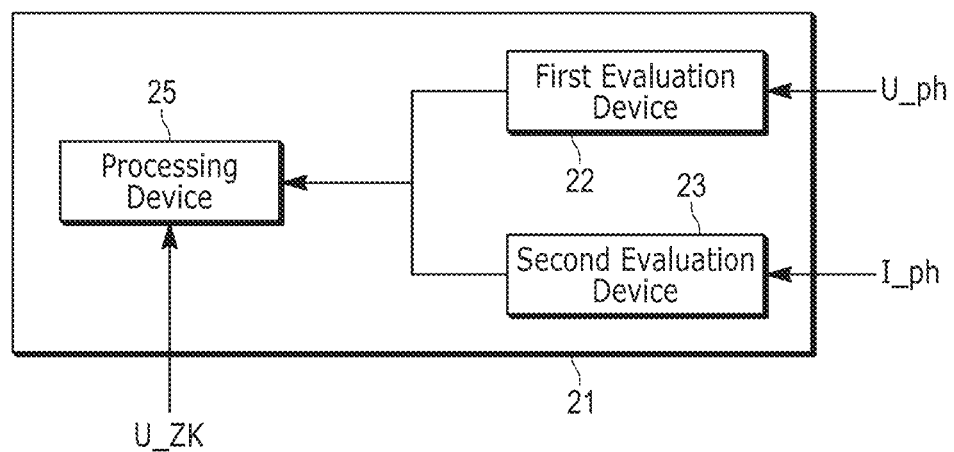
FIG. 3: is a schematic view of a block diagram of a safety device for a control device according to an embodiment.

FIG. 3 is a schematic view of a block diagram of a safety device 20 according to an embodiment. The safety device 21 can detect, for example, the electric voltages U_ph at the phase connections of the electric machine 3. A first evaluation device 22 can evaluate these phase voltages U_ph, in particular in freewheeling mode, and determine the rotational speed of the electric machine 3 using the phase voltage U_ph. Furthermore, the phase currents I_ph may be provided at the second safety device 21. For example, a second evaluation device 22 may detect the phase currents I_ph and determine the rotational speed of the electric machine 3 on the basis of said phase currents I_ph. In particular, the determination of the rotational speed may take place on the basis of the phase currents I_ph in the active short-circuit. The determined rotational speed from the first evaluation device 22 and/or the second evaluation device 23 may be provided to a processing device 25. Therefore, the processing device 25 may in each case determine a suitable safe operating mode depending on the rotational speed and, as necessary, accordingly control the switching elements H1, H2, H3, L1, L2, L3 in the inverter 30.

If, during the safe operating mode in the electric drive system, the electrical energy source 1 is disconnected from the inverter arrangement 2 by opening the battery isolation switch 1a, the intermediate circuit capacitor 31 at the input of the inverter 30 may discharge over time, in particular in the case of an active short-circuit. There is thus a risk that, in the case of too deep a discharging of the intermediate circuit capacitor 31, sufficient energy is no longer available for supplying the safety device 21 in the second control path 20. Therefore, the safety device 21 may monitor the intermediate circuit voltage U_IC of the intermediate circuit capacitor 31 in the second control path 20. If the intermediate circuit voltage U_IC at the intermediate circuit capacitor 31 falls below a predetermined threshold voltage, a change into the freewheeling mode operation may be briefly effected even at high rotational speeds. As a result, the intermediate circuit capacitor 31 may be further charged. However, in order to avoid an excessive increase in the electrical voltage at the intermediate circuit capacitor 31 specifically at higher rotational speeds, it is possible to change back into the active short-circuit if a second threshold voltage is exceeded. In this case, the second threshold voltage should preferably be lower than the electrical voltage provided by the electrical energy store 1. For example, a voltage which corresponds to the synchronous generated voltage in the freewheeling mode at the switchover point for the rotational speed-dependent safe mode may be selected as a voltage value for the change from active short-circuit into the freewheeling mode.

In order to even further increase the reliability of the electric drive system, the rotational speed of the electric machine 3 determined by the first safety device 11 and the rotational speed of the electric machine 3 determined by the second safety device 21 may be compared with one another during normal operation of the electric drive system. If a significant difference of the two determined rotational speeds is detected, this can provide an indication of a malfunction in at least one of the two safety devices.

Figure 4:
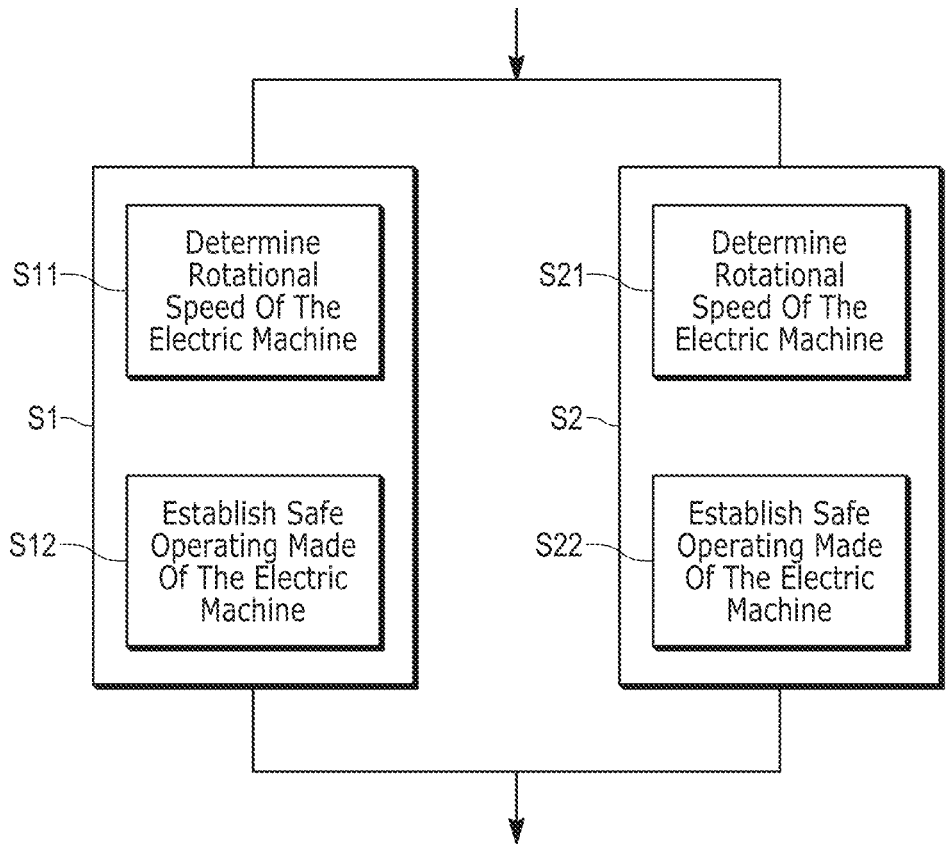
FIG. 4: is a workflow diagram, as forms the basis of a method for establishing a safe operating mode according to an embodiment.

FIG. 4 is a schematic view of a workflow diagram for a method for establishing a safe operating mode in an electric drive system. The method may in principle comprise any steps as have already been previously described in conjunction with the electric drive system. Accordingly, the electric drive system, in particular the control device, may also comprise any suitable components as are described below in conjunction with the method.

The method comprises two parallel steps S1 and S2. Step S1 is in this case executed by a first control path 10, and step S2 is executed by a second control path 20. As already described above, the first control path 10 may be fed by a low-voltage network, and the second control path 20 may be fed by a high-voltage network. A determination S11 of a rotational speed of the electric machine 3 takes place in step S1.

A safe operating mode of the electric machine may subsequently be established in step S12. The safe operating mode may be established depending on the rotational speed, i.e. using the determined rotational speed. In particular, an active short-circuit or a freewheeling mode in the inverter of the electric drive system may be established depending on the determined rotational speed.

Analogously, step S2 comprises a step S21 for determining the rotational speed of the electric machine and a step S22 for establishing a safe operating mode. In this case, the safe operating mode may also be established using the rotational speed determined in step S21, wherein either a freewheeling mode or an active short-circuit may be established as a safe operating mode, depending on the rotational speed.

In summary, the present invention relates to the establishment of a rotational speed-dependent safe operating mode. For this purpose, two redundant control paths are provided which may each establish either an active short-circuit or a freewheeling mode as a safe operating mode, depending on the rotational speed. In this way, a rotational speed-dependent safe operating mode may still be fully established even in the case of a failure of a control path.

The invention claimed is:
1. A control device for an inverter (30) in an electric drive system, the control device comprising:
 a first processor (25) and a second processor (25) which are each configured to establish a safe operating mode in a shared inverter (30) connected to both the first processor (25) and the second processor (25),
 wherein the first processor (25) is configured to determine a rotational speed of an electric machine (3) of the electric drive system and, using the determined rotational speed of the electric machine (3), to establish, as the safe operating mode, either an active short-circuit or a freewheeling mode in the shared inverter (30);
 wherein the second processor (25) is configured to determine the rotational speed of the electric machine (3) of the electric drive system and, using the determined rotational speed of the electric machine (3), to establish, as the safe operating mode, either the active short-circuit or the freewheeling mode in the shared inverter (30), and
 wherein the first processor (25) and/or the second processor (25) are configured to establish an active short-circuit in the inverter (30) in response to the determined rotational speed of the electric machine (3) exceeding a first threshold value (n1), and to establish a freewheeling mode in response to the determined rotational speed of the electric machine (3) falling below a second threshold value (n2).

2. The control device according to claim 1, wherein the control device is configured to control a plurality of half-bridges of the shared inverter, and
 wherein the first processor (25) and/or the second processor (25) are configured to control switching elements (L1, L2, L3, H1, H2, H3) in the half-bridges, using phase currents in corresponding phases, for the establishment of a freewheeling mode.

3. The control device according to claim 1, wherein the control device is configured to control an inverter (30) having a plurality of half-bridges, and
 wherein the first processor (25) and/or the second processor (25) are configured to control switching elements (L1, L2, L3, H1, H2, H3) in the half-bridges, using phase voltages in corresponding phases, for the establishment of an active short-circuit.

4. The control device according to claim 1, wherein the first processor (25) is configured to verify the determined rotational speed of the electric machine (3) using the rotational speed determined by the second processor (25).

5. The control device according to claim 1, wherein the first processor (25) is configured to be fed from a low-voltage side of the electric drive system, and the second processor (25) is configured to be fed from a high-voltage side of the electric drive system.

6. The control device according to claim 1, wherein the second processor (25) is configured to establish the freewheeling mode as a safe operating mode in the event that an intermediate circuit voltage of the shared inverter (30) falls below a predetermined first threshold voltage.

7. The control device according to claim 6, wherein the second processor (25) is configured to establish the active short-circuit as a safe operating mode in the event that an intermediate circuit voltage of the shared inverter exceeds a predetermined second threshold voltage and the determined rotational speed is greater than the first threshold voltage.

8. The control device according to claim 1, wherein the second processor (25), which is configured to determine the rotational speed of the electric machine (3) during the active short-circuit using forward voltages through switching elements in the shared inverter (30).

9. The control device according to claim 1, wherein the second processor (25 is configured to determine the rotational speed of the electric machine (3) during the free-wheeling mode under at least two phase voltages of the electric machine (3).

10. An electric drive system comprising:
 an electric machine (3);
 an shared inverter (30) which is configured to control the electric machine (3); and
 a control device including
 a first processor (25) and a second processor (25) which are each connected to the shared inverter and configured to establish a safe operating mode in the shared inverter (30) of the electric drive system,
 wherein the first processor (25) is configured to determine a rotational speed of an electric machine (3) of the electric drive system and, using the determined rotational speed of the electric machine (3), to establish, as the safe operating mode, either an active short-circuit or a freewheeling mode in the shared inverter (30);
 wherein the second processor (25) is configured to determine the rotational speed of the electric machine (3) of the electric drive system and, using the determined rotational speed of the electric machine (3), to establish, as the safe operating mode, either the active short-circuit or the freewheeling mode in the shared inverter (30), and
 wherein the first processor (25) and/or the second processor (25) are configured to establish an active short-circuit in the inverter (30) in response to the determined rotational speed of the electric machine (3) exceeding a first threshold value (n1), and to establish a freewheeling mode in response to the determined rotational speed of the electric machine (3) falling below a second threshold value (n2).

11. A method for establishing a safe operating mode in an electric drive system, the method comprising the steps of:
 determining (S11) a rotational speed of an electric machine (3) of the electric drive system and establishing (S12) a safe operating mode in the electric machine (3) by means of redundant processors (25), each configured to establish (S21) a safe operating mode using the determined rotational speed by establishing either an active short-circuit or a freewheeling mode in a shared inverter (30) of the electric drive system, and
 wherein the redundant processors (25) are each configured to establish an active short-circuit in the inverter (30) in response to the determined rotational speed of the electric machine (3) exceeding a first threshold value (n1), and to establish a freewheeling mode in response to the determined rotational speed of the electric machine (3) falling below a second threshold value (n2).

12. The method as claimed in claim 11, wherein at least one of the redundant processors (25) is fed power by a high-voltage side of the electric drive system.

13. A method for establishing a safe operating mode in an electric drive system, the method comprising the steps of:
 determining (S11) a rotational speed of an electric machine (3) of the electric drive system and establishing (S12) a safe operating mode in the electric machine (3) by means of a first processor (25) wherein the establishment (S12) of the safe operating mode, via the first processor (25) using the determined rotational speed, establishes either an active short-circuit or a freewheeling mode in a shared inverter (30) of the electric drive system;

determining (S21) a rotational speed of the electric machine (3) of the electric drive system and establishing (S22) the safe operating mode in the electric machine (3) by means of a second processor (25), wherein the establishment (S22) of the safe operating mode, via the second processor (25) using the determined rotational speed establishes, either the active short-circuit or the freewheeling mode in the shared inverter (30) of the electric drive system, wherein the shared inverter is connected to the first processor (25) and to the second processor (25), and wherein the first processor (25) and/or the second processor (25) are configured to establish an active short-circuit in the inverter (30) in response to the determined rotational speed of the electric machine (3) exceeding a first threshold value (n1), and to establish a freewheeling mode in response to the determined rotational speed of the electric machine (3) falling below a second threshold value (n2).

\* \* \* \* \*